United States Patent
Schramm et al.

(10) Patent No.: US 7,199,371 B2
(45) Date of Patent: Apr. 3, 2007

(54) SPECT EXAMINATION DEVICE

(75) Inventors: Nils Schramm, Jülich (DE); Horst Halling, Inden-Pier (DE); Gernot Ebel, Göttingen (DE)

(73) Assignees: Forschungszentrum Julich GmbH, Julich (DE); Scivis GmbH, Gottingen (DE)

( * ) Notice: Subject to any disclaimer, the term of this patent is extended or adjusted under 35 U.S.C. 154(b) by 143 days.

(21) Appl. No.: 10/487,700

(22) PCT Filed: Aug. 2, 2002

(86) PCT No.: PCT/EP02/08604

§ 371 (c)(1),
(2), (4) Date: Jul. 7, 2004

(87) PCT Pub. No.: WO03/021292

PCT Pub. Date: Mar. 13, 2003

(65) Prior Publication Data
US 2004/0239941 A1   Dec. 2, 2004

(30) Foreign Application Priority Data
Aug. 31, 2001  (DE)  ................................ 101 42 421

(51) Int. Cl.
*G01T 1/164*   (2006.01)

(52) U.S. Cl. .................................. 250/363.04; 356/479

(58) Field of Classification Search ........... 250/363.04, 250/363.06
See application file for complete search history.

(56) References Cited

U.S. PATENT DOCUMENTS

| | | | |
|---|---|---|---|
| 5,462,056 A | | 10/1995 | Hawman et al. |
| 5,821,541 A | * | 10/1998 | Turner .................... 250/370.09 |
| 6,392,235 B1 | * | 5/2002 | Barrett et al. .......... 250/363.06 |
| 6,628,984 B2 | * | 9/2003 | Weinberg .................... 600/436 |
| 6,881,959 B2 | * | 4/2005 | Meng et al. ............. 250/363.1 |
| 2006/0065840 A1 | * | 3/2006 | Joung et al. ........... 250/363.05 |

FOREIGN PATENT DOCUMENTS

WO   WO 01/52269 A1   7/2001

OTHER PUBLICATIONS

M. Ivanovic et al., "Multi-Pinhole Collimator Optimization for High Resolution SPECT Imaging", Nuclear Science Symposium, IEEE Albuquerque, NM, Nov. 9-15, 1997, p. 1097-1101.

* cited by examiner

*Primary Examiner*—Otilia Gabor
(74) *Attorney, Agent, or Firm*—Pearne & Gordon LLP

(57) ABSTRACT

A tomography device, particularly for single photon emission computed tomography (SPECT), comprises a multi-pinhole collimator and a detector for detecting gamma quanta or photons that penetrate the multi-pinhole collimator. In a tomographic method using the device, the distance between the object and the multi-pinhole collimator is selected to be smaller than the distance between the multi-pinhole collimator and the surface of the detector.

12 Claims, 1 Drawing Sheet

SPECT EXAMINATION DEVICE

SPECT EXAMINATION DEVICE

BACKGROUND OF THE INVENTION AND RELATED ART

The invention discloses a device and a method for tomography, especially single photon emission computed tomography (SPECT).

Single photon emission computed tomography is a method with associated devices for three-dimensional imaging of radio pharmaceuticals, which have been introduced into an object. Human beings or animals may be provided as the object. The radio pharmaceuticals introduced into the object emit photons or gamma quanta. These photons are registered and evaluated by the device. The position, that is to say, the spatial distribution of the radio pharmaceuticals, is obtained as the result of this evaluation. In turn, the position of the radio pharmaceuticals allows inferences to be made regarding the object, for example, regarding a distribution of tissue in the object.

One known device for the implementation of single photon emission computed tomography comprises a gamma camera and a collimator positioned in front of the camera. The collimator is generally a lead plate with a large number of channels passing in a perpendicular direction through the plate. The provision of these channels ensures that, on the one hand, only photons passing in a perpendicular direction are registered and, on the other hand, that a spatially resolved measurement is possible. The camera together with the collimator is moved around the object. As a result, a large quantity of positional data is gathered. These data are known as projection shots. The position of the radio pharmaceuticals within the object can be determined from the positional data obtained from around the object.

In order to screen scattered radiation originating from the photons, it is generally also necessary to gather energy data. The camera is therefore normally designed in such a manner that the energy of the falling photons can be determined at the same time.

Scattered radiation always provides a lower energy by comparison with the actual measured radiation. Accordingly, scattered radiation can be screened ignoring photons with low energy. Determining an upper limit for the energy of the photons may also be relevant for screening background radiation.

The methods and/or the devices described above already represent part of the general available technical knowledge, because methods and devices of this kind have been used for more than 30 years.

Single photon emission computed tomography (SPECT) and position emission tomography (PET) are instruments for the quantitative imaging of spatial radio tracer distributions in vivo. Alongside their use in human medicine, these methods can be used in pharmacological and pre-clinical research for the development and evaluation of innovative tracer compounds. Although various systems for the examination of small laboratory animals are already available in the context of PET, corresponding developments have not been made in the field of SPECT or have only been made to an inadequate extent; indeed, this is still the case although TC-99 m and I-123-marked radio pharmaceuticals have a disproportionately greater relevance than PET nuclides.

A high-resolution, high-sensitivity animal SPECT would provide the advantage for pre-clinical research of an animal-preserving method, which would allow dynamic and reproducible studies of an individual to be performed with reliably informative results. This advantage is favoured by the fact that, with the above named radio isotopes, extremely high specific activities can be achieved (a factor of approximately 100 by comparison with PET nuclides), which are indispensable for interference-free in vivo measurements (low mass dose). In this context, corresponding marking methods must still be developed.

SUMMARY OF THE INVENTION

To improve the positional resolution by comparison with the prior art named above, a pinhole collimator is used in single photon emission computed tomography. A pinhole collimator is characterised by a single pinhole, through which the photons pass. If the object is closer to the pinhole collimator than the surface of a gamma camera and/or of a detector, this will ultimately achieve an enlarged positional resolution. The photons do not pass through the pinhole collimator exclusively in an perpendicular direction. Instead, they enter and leave in a conical shape. Since the cone located behind the pinhole collimator is larger than the cone in front of the pinhole collimator, an improvement in positional resolution is achieved by comparison with the prior art named in the introduction.

In order to obtain a good positional resolution with a pinhole collimator, the aperture and/or pinhole, through which the photons pass, should be small. However, the smaller a pinhole is, the fewer the photons which will pass through this pinhole. Accordingly, as the pinholes become smaller, the sensitivity of the device declines in a disadvantageous manner. In this context, sensitivity is defined as the ratio of the measured counting rate to the activity present in the object.

If the sensitivity is too low, single photon emission computed tomography is ultimately no longer possible.

BRIEF DESCRIPTION OF THE DRAWINGS

The drawing schematically shows a radiation emitting object to be imaged by tomography using a detector and a multiple pinhole collimator in accordance with the invention.

DETAILED DESCRIPTION OF THE INVENTION

Figure 1:
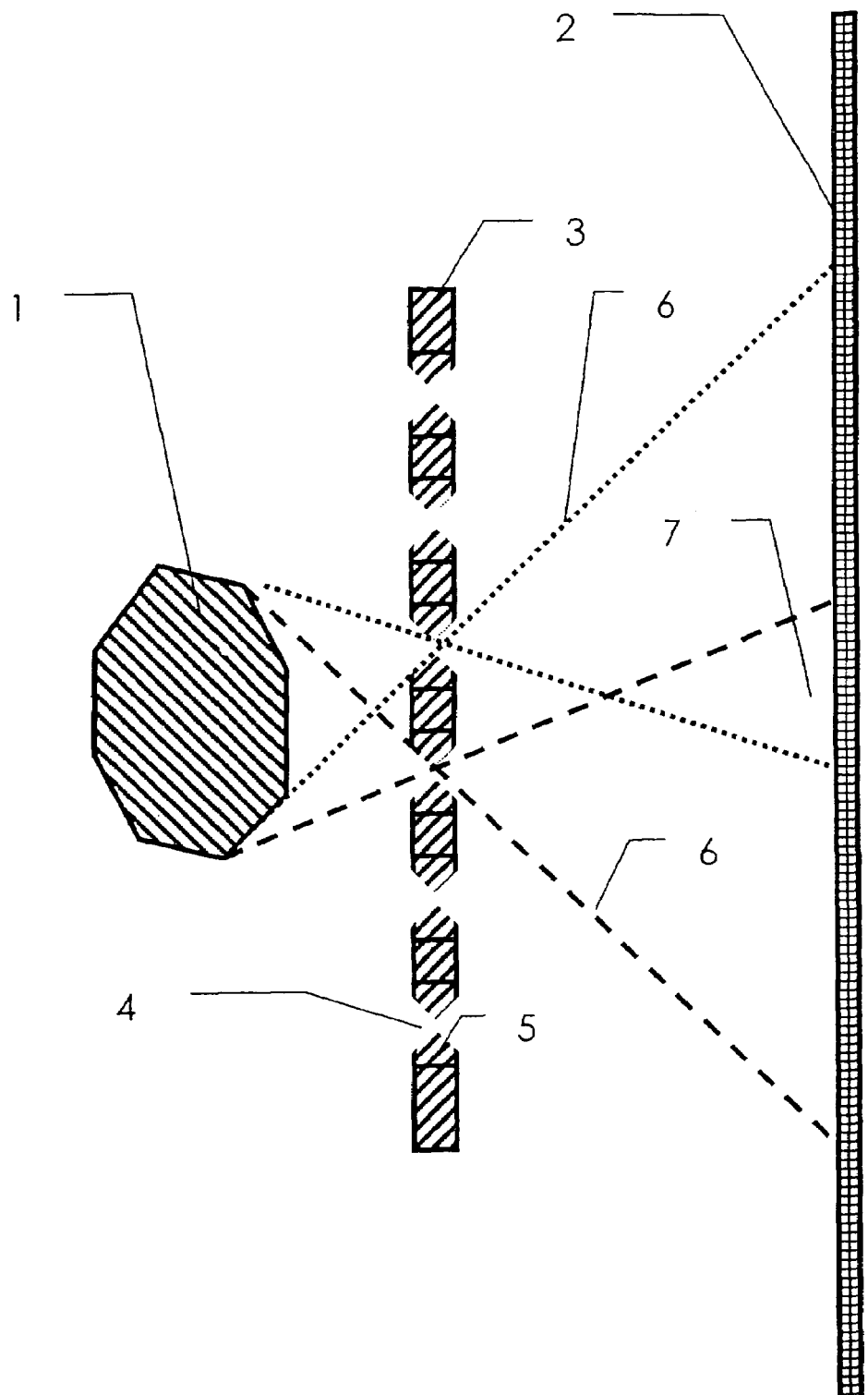

The object of the invention is to create a device with an associated method of the type named above, which allows high-resolution and high-sensitivity measurements.

The device claimed comprises a multiple-pinhole collimator together with a detector for registering photons which pass through the multiple-pinhole collimator. Accordingly, the collimator provides a large number of pinholes. In one embodiment of the invention, the detector is designed in such a manner that it can also measure the energy of the photons detected.

Since the collimator provides several pinholes, the sensitivity of the device is increased accordingly. The use of a pinhole collimator, by comparison with the use of collimators which can only register perpendicular beams falling in a perpendicular direction, provides the advantage of a high positional resolution. Accordingly, a device with good positional resolution and good sensitivity is provided.

During the operation of the device, the object is closer to the multiple-pinhole collimator than the camera and/or detector surface, in order to achieve a good positional resolution. Within the device, the holder for the object (patient stretcher) is therefore closer to the multiple-pinhole collimator than the camera and/or detector.

The distances between the individual apertures or pinholes in the multiple-pinhole collimator are preferably selected in such a manner that the cones striking the camera sometimes overlap. It is advantageous to allow overlapping regions in order to achieve a good positional resolution and good sensitivity. In one embodiment of the invention, these overlapping regions represent no more than 30%, preferably up to 70% of the total area of a cone, which is formed by the photons passing through a pinhole in the multiple-pinhole collimator.

In conventional pinhole tomography (pinhole tomography), the centre of the pinhole is located on the midline perpendicular of the detector. Furthermore, the axis of the pinhole, that is, the axis of symmetry of the pinhole in the collimator is perpendicular to the detector. In this context, a reconstruction method is used, wherein it is assumed that the photon which strikes the camera from the centre of the object forms a right angle with the camera surface. The base area of the cone which is formed on the camera will then always be circular.

When using a multiple-pinhole collimator, this situation is frequently not the case. Accordingly, in one embodiment of the invention, a reconstruction method is provided, which takes such deviating conditions into account. If a photon originating from the centre of the object no longer strikes the surface of the camera and/or the detector in a perpendicular direction, then a circular cone (idealised condition) will not be formed on the surface of the camera. Instead, the cone on the camera will always take the form of an ellipse. According to the invention, this problem is resolved by using an iterative reconstruction method. The starting point of the iterative reconstruction method is an assumed distribution within the object and indeed generally a spatial distribution. A calculation is then performed to determine which mass results would achieve the assumed distribution. The calculated result is then compared with the actually measured results. Following this, a new, modified distribution is assumed. Once again, the result formed on the camera for this new distribution is calculated and compared. The calculations investigate whether the new distribution corresponds more closely to the measured result. In this manner, after an adequate number of steps have been implemented, a distribution is determined wherein the calculated results agree adequately well with the actual results (measured results). In particular, the iterative reconstruction method is concluded, when the calculated results agree with the measured result with a specified accuracy. The iteration method therefore comprises a so-called forward projection, that is to say, the calculation of the results for an assumed distribution.

The iterative method also provides the advantage that overlapping areas of the cones formed on the surface of the camera and/or detector can be compared with the actual result. For this reason, the method is preferable to other reconstruction methods. It is therefore also possible to allow overlapping regions thereby achieving a good positional resolution.

In a further embodiment of the invention, the multiple-pinhole collimator provides a plate, which is manufactured from tungsten and iridium. These materials provide a better attenuation coefficient relative to photons by comparison with lead. Iridium is the more suitable of the named materials for the attenuation of photons. However, iridium is extremely expensive. Accordingly, for reasons of cost, tungsten is used in those positions in which the requirements for attenuation performance are lower. Those parts of the plate in which the requirements for the attenuation of photons are particularly high are manufactured from iridium. In particular, this relates to the regions of the plate which are adjacent to the pinholes.

A pinhole in the plate advantageously opens from both sides into the plate in the form of a funnel. The requirement for attenuation is particularly high at this position, especially regarding the walls of the pinhole. Accordingly, the funnel walls are preferably manufactured from iridium. In this context, the plate is typically 3 to 10 mm thick.

Photons which originate from the interior of the object are generally attenuated in dependence upon the tissue. In order to take this attenuation into account in the evaluation according to the prior art, a homogeneous attenuation coefficient is assumed, which corresponds to the attenuation coefficient of water. The attenuation is, however, additionally dependent upon the contour of the object. In one embodiment of the invention, the outer contour of the object is determined within the framework of the evaluation, and the attenuation is calculated in dependence upon the contour. Further-improved results are obtainable in this manner.

The measure for the outer contour of the object is the Compton scattered radiation. In one embodiment of the invention, the Compton scattered radiation is measured, for example, in a so-called Compton window. The Compton scattered radiation is taken into account within the reconstruction method, and the contour of the object is determined from this.

When a photon strikes the camera and/or the detector, the position of incidence is measured with an inaccuracy typical of the camera or the detector. In a further embodiment of the method, within the context of a forward projection, upon which the iterative reconstruction method is based, the imaging property, that is to say the inaccuracy typical of the camera or the detector, is taken into account in the evaluation. Once again, taking the inaccuracy of measurement into account by means of an iterative method of the type named above is both successful and reliable.

If a radiation source disposed within the object is located at a distance relatively remote from the multiple-pinhole collimator (that is to say, in a region of the object, which is particularly remote from the collimator), then the sensitivity will decline. One embodiment of the reconstruction method, takes this reduction of sensitivity into account in the forward projection.

The imaging performance of the camera and/or the detector also depends upon the distance between the radiation source and the multiple-pinhole collimator. This imaging performance changing in dependence upon distance is also taken into account iteratively in one embodiment of the method.

Relevant program segments for an iteration method, which is capable of working through the steps of the invention described above, are indicated below. The programs consist of the input parameters listed below. Typical values for input parameters of this kind are also indicated. The term "hole" is used synonymously with the term "pinhole" (of the multiple-pinhole collimator).

Regarding the calculation of the contour and/or the outline of the object, one embodiment performs the calculation of the object contour in an "zeroed" iteration. This makes use of a property of Compton scattering which actually degrades the image quality: namely photons detected with a wrong direction.

Photons detected a wrong direction represent a background in the projections, which disadvantageously impairs the image quality. However, they can also be of benefit. In practically all clinical cases, they cause the entire extension of the patient to appear in the projections. Even if a tracer, that is to say, a radio pharmaceutical, is deposited very specifically in a narrowly circumscribed organ, photons seem to originate from all other regions of the patient used for imaging. In fact, these are photons, which have their origin in the narrowly circumscribed organ, but, as a result of Compton scattering, they appear to "illuminate" the entire patient. This circumstance is exploited in order to calculate the contour of the object.

The calculation takes place in several stages:
1) Production of "binary" projections. These represent a simplification of the actual projection, because any pixel content greater than 0 is set to 1.

The essential characteristic in this context is a user-controlled threshold setting, which on the basis of conclusiveness, separates the projection of the actual object of examination, the patient, from the background. Calculation of this threshold is based on an averaged maximum derived from all projections.
2) Back projection of the binary projections into the object space
3) On the basis of the "multiplicity" of voxels (small, generally cubic element of volume), that is, the frequency, with which a voxel is observed under the relevant collimator geometry over all angles of the projections, a threshold (determined heuristically for the relevant geometry) establishes which voxels belong in the very first approximation to the interior space of the body. (The limitation of the interior space of the body is the body contour.)
4) Multiple folding with 3d-folding core
5) Repetition of point 3
6) Double run-through of
   a) 3d-folding
   b) Inclusion of the voxels, into which something has been folded, in the interior space of the body.

```
Input command                                           Meaning

Projections (float) : maus.prj                          Projections measured
Width of projection [pix] : 266                         Transverse dimension
Layers in projection [pix] : 193                        Axial dimension
Number of angles : 60                                   Number of projections
Pixel size in projection [mm] : 2                       Size of projection pixel
Smooth projection (no=0 yes=1) : 1                      Smoothing of measured projections
Spacing of rotational axis/image plane [mm] : 155       Distance from image plane to rotational axis
Name of aperture pattern (text) : aperture.txt          Name of aperture file (see below)

Thickness of crystal [mm] : 10                          Thickness of scintillator
Absorption of crystal [1/cm] : 1.173                    Absorption coefficient of crystal
Intrinsic resolution [mm] : 3.3                         Intrinsic resolution of the camera
Absorption intensity of gamma [%] : 90                  Absorption intensity of the gamma line Start distribution (float) : maus.sta                   Start distribution of the reconstruction
Width of reconstruction [pix] : 112                     Transverse dimension
Layers of reconstruction [pix] : 262                    Axial dimension
Voxel size in reconstruction [mm] : 0.4                 Size of object voxel
Number of iterations : 30                               Number of iterations
Smooth volume (no=0 yes=1) : 1                          Smoothing of volume data
Imaging factor voxel-wise (no=0 yes=1)? : 0             Take PSF into account voxel-wise or fold with
                                                        mean PSF?

Deviation from original (no=0 yes=1)? : 0               Measure deviation from original?
Root name of output : maus                              Root name of output files
Save all? : 5                                           Save intermediate results?
```

Structure of the aperture file.

The typical structure of the aperture file is as follows:

```
7
      45   18.435   66.503    1.5     60   22.278    21.53    27.9
      45  -18.435   55.858    1.5     60  -22.278   26.164    27.9
      45   36.871   13.306    1.5     60    39.33   -6.8974   27.9
      45        0   2.6613    1.5     60        0  -1.3859    27.9
      45  -36.871  -7.9839    1.5     60   -39.33   4.1513    27.9
      45   18.435  -50.535    1.5     60   22.278  -28.355    27.9
      45  -18.435  -61.181    1.5     60  -22.278  -23.889    27.9
```

The first entry refers to the number of pinholes. Each subsequent line describes one pinhole.
The meaning of the entries is:-

| Column | Meaning |
|---|---|
| 1 | x – coordinate of the centre of the pinhole, i.e. spacing of the pinhole. |

|   |   |
|---|---|
|   | from the rotational axis in mm |
| 2 | y – coordinate of the pinhole, i.e. transverse deflection of the P.H. |
| 3 | z – coordinate of the pinhole, i.e. axial deflection of the P.H. |
| 4 | internal diameter of the double-funnel shaped pinhole |
| 5 | acceptance angle of the pinhole in degrees |
| 6 | internal i.e. transverse angle of inclination of the pinhole axis |
| 7 | Axial angle of inclination of the P.H. axis |
| 8 | Linear attenuation coefficient of the aperture material in 1/cm |

```
/*****************************************************************
    mpr.c          Authors:  Dr. Nils Schramm (Research Centre Jülich)
                             Dr. Gernot Ebel (Scivis) company Date: 20.08.2001

MLEM variants of the iterative multi- pinhole reconstruction
    The algorithm includes the position-dependent sensitivity and the position-dependent imaging
    function for an MP aperture with holes positioned/inclined as required.
******************************************************************/ include <stdio.h>
include <stdlib.h>
#include <sys/stat.h>
#include <unistd.h>
#include <math.h>
include <time.h> include "/home/schramm/src/util/util.h"

define Wd2 M_PI                                /* half angular range*/
#define Q 250                             /* resolution of the PSF */
define U 2.5                                   /* PSF-width (98.7%)*/ define sci(m,k,l)  sci[(m)*KL+(k)*L+l]        /* Measured projections */
define prj(l,k)    prj[(l)*K+k]               /* Calculated projections */
#define rec(j,i,s)  rec[(j)*NS+(i)*S+s]              /* Reconstruction */
#define rot(j,i,s)  rot[(j)*NS+(i)*S+s]      /* Rotated reconstruction */
#define psf(h,l,k)  psf[(h)*CC+(1+Cd2)*C+k+Cd2]     /* Imaging function */
#define kn2(l,k)    kn2[(1+Ed2)*E+k+Ed2]                   /* 2D-Core */
define kn3(l,k,h)  kn3[(1+Ed2)*EE+(k+Ed2)*E+h+Ed2]        /* 3D-Core */ int   N, S, M, K, L, NN, NS, KL, T, C, CC, Cd2;
float P, A, q, p, W, cth, cmu, gin, res;
float *x2, *y2, *z2, *hd, *alf, *psi, *the, *amu;

float *PSF( float *sen, unsigned char *ise, unsigned char *ihb );
void   SUM( float *prj, float *rot, float *sen, unsigned char *ise,
            float *psf, unsigned char *ihb );
void   PRJ( float *prj, float *rot, float *sen, unsigned char *ise,
            float *psf, unsigned char *ihb );
void   QUO( float *prj, float *sci, int m );
void   REP( float *rot, float *ron, float *prj, float *sen,
            unsigned char *ise );
void   NRM( float *cor, float *nrm );
void   COR( float *rec, float *cor );
void   SAV( float *rec, float *rot, char *basen, int iter );
void   ROT( float *rot, float *rec, float phi );
void   RAY( float *V, float *H, float *a, float *b, float *c, float *d,
            float r, float t, float i2sico );
void   PIX( float *F, float *a, float *b, float *c, float *d, float r,
            float t, float i2sico, float ta, float ct );
void   SM2( float *sci, float *prj );
void   SM3( float *rec, float *rot );
float  LLH( float *prj, float *sci, int m );
```

```c
void  DEV( FILE *devf, float *obj, float *rec, float llh, int n );

/****************************************************************
    MAIN()  Main program with user input, memory initialisation and the actual
            reconstruction loop.
****************************************************************/ main()
{
   unsigned char *ise, *ihb;
   char scin[256], aptn[256], stan[256], objn[26], basen[256], fulln[256];
   int s, i, j, m, k, l, t, stat, ticks, aflag, dflag, pflag, vflag, I, nsave;
   float *sci, *prj, *rec, *rot, *cor, *nrm, *ron, *sen, *psf, *obj, llh;
   FILE *parf, *aptf, *devf;

/*====== 0) User inputs                ===========================*/ printf( "\n Projections (float) : " );
   scanf( "%s", scin );
   printf( " Width of projections [pix] : " );
   scanf( "%i", &L );
   printf( " Layers in projections [pix] : " );
   scanf( "%i", &K );
   printf( " Number of angles : " );
   scanf( "%i", &M );
   printf( " Pixel size in projection [mm] : " );
   scanf( "%g", &P );
   printf( "Smooth projections (no = 0/yes = 1): " );
   scanf( "%i", &pflag );
   printf( "Spacing rotational axis/image plane [mm] : " );
   scanf( "%g", &A );
   printf( "Name of aperture pattern (text) : " );
   scanf( "%s", aptn );
   printf( "\n" );

printf( "Thickness of crystal [mm] : " );
   scanf( "%g", &cth );
   printf( " Absorption of crystal [1/cm] : " );
   scanf( "%g", &cmu );
   printf( "Intrinsic resolution [mm] :  " );
   scanf( "%g", &res );
   printf( "Spacing intensity of the gamma [%] : " );
   scanf( "%g", &gin );
   printf( "\n" );

printf( "Start distribution (float) : " );
   scanf( "%s", stan );
   printf( "Width of reconstruction [pix] : ");
   scanf( "%i", &N );
   printf( "Layers of reconstruction [pix] : ");
   scanf( "%i", &S );
   printf( "Voxel size in reconstruction [mm] : " );
   scanf( "%g", &p );
   printf( "Number of iterations : " );
   scanf( "%i", &I );
   printf( "Smooth volume (no = 0/yes = 1): " );
   scanf( "%i", &vflag );
   printf( " Imaging function voxel-wise (no = 0/yes = 1)? : " );
   scanf( "%i", &aflag );
   printf( "\n" );

printf( " Deviation from original (no = 0/yes = 1)? : " );
   scanf( "%i", &dflag );
   if( dflag == 1 )
   {
      printf( "Original data (float) : " );
      scanf( "%s", objn );
   }
   printf( "Root name of output : " );
   scanf( "%s", basen );
   printf( "Save all? : ");
   scanf( "%i", &nsave );
   printf( "\n" );

/*====== 1) Print parameters          ===========================*/ sprintf( fulln, "%s.par", basen );
   parf = FOPEN( fulln, "wt" );
```

```c
    fprintf( parf, "\n Algorithm : mpr.c\n" );
    fprintf( parf, "Parameter file (text): %s.par\n", basen );
    fprintf( parf, "\n" );

fprintf( parf, "Projections (float): %s\n", scin );
    fprintf( parf, "Width of projections [pix]: %i\n", L );
    fprintf( parf, "Layers of projection [pix]: %i\n", K );
    fprintf( parf, "Number of angles : %i\n", M );
    fprintf( parf, "Pixel size in projections [mm]: %g\n", P );
    fprintf( parf, "Smooth projections (no = 0/yes = 1): %i\n", pflag );
    fprintf( parf, "Spacing rotational axis/image plane [mm] : %g\n", A );
    fprintf( parf, "Name of aperture pattern(text): %s\n", aptn );
    fprintf( parf, "\n" );

fprintf( parf, "Thickness of crystal[mm]: %g\n", cth );
    fprintf( parf, "Absorption of crystal  [1/cm]: %g\n", cmu );
    fprintf( parf, "Intrinsic resolution   [mm]: %g\n", res );
    fprintf( parf, "Absorption intensity of gamma : %g\n", gin );
    fprintf( parf, "\n" );

fprintf( parf, "Start distribution (float): %s\n", stan );
    fprintf( parf, "Width of reconstruction [pix]: %i\n", N );
    fprintf( parf, "Layers of reconstruction [pix]: %i\n", S );
    fprintf( parf, "Voxel size in reconstruction [mm]: %g\n", p );
    fprintf( parf, "Number of iterations: %i\n", I );
    fprintf( parf, "Smooth volume (no = 0/yes = 1):% i\n", vflag );
    fprintf( parf, "Imaging function voxel-wise (no = 0/yes = 1)voxel-wise : % i\n", aflag );
    fprintf( parf, "\n" );

fprintf( parf, "Deviation from original (no = 0/yes = 1)?:% i\n", dflag );
    if( dflag == 1 )
    {
        fprintf( parf, "Original data (float): %s\n", objn );
        fprintf( parf, "Deviation file  (text): %s.dev\n", basen );
    }
    fprintf( parf, "Reconstruction: %s.rnn\n", basen );
    fprintf( parf, "Save all?      : %i\n", nsave );
    fprintf( parf, "\n" );

FCLOSE( parf );

/*====== 2) Read in aperture pattern ==============================*/ fprintf( stderr, "Initializing...\n" );

aptf = FOPEN( aptn, "rt" );
    fscanf( aptf, "%i", &T );

x2  = MALLOC( T*sizeof( float ) );
    y2  = MALLOC( T*sizeof( float ) );
    z2  = MALLOC( T*sizeof( float ) );
    hd  = MALLOC( T*sizeof( float ) );
    alf = MALLOC( T*sizeof( float ) );
    psi = MALLOC( T*sizeof( float ) );
    the = MALLOC( T*sizeof( float ) );
    amu = MALLOC( T*sizeof( float ) );

for( t=0; t<T; t++ )
    {
        stat = fscanf( aptf, "%g%g%g%g%g%g%g%g", &x2[t], &y2[t], &z2[t], &hd[t], &alf[t],
 &psi[t], &the[t], &amu[t] );

if( stat == EOF )
            ERROR( "MAIN(): Error aperture pattern  !" );

alf[t] = M_PI*alf[t]/180;        /*convert to rad and mm */
        psi[t] = M_PI*psi[t]/180;
        the[t] = M_PI*the[t]/180;
        amu[t] = amu[t]/10;
    }

FCLOSE( aptf );

/*====== 3) Request memory and initialise            ============*/ if( nsave < 1 || nsave > I )           /* only meaningful values*/
        nsave = I;
```

```c
    cmu = cmu/10;                                      /* Crystal Mue in 1/mm*/
    W = 2*Wd2;                                         /* Full angular range */
    NN = N*N;                                                    /* Constants */
    NS = N*S;
    KL = K*L;

sci = MALLOC( M*KL*sizeof( float ) );                        /* Memory */
    prj = MALLOC( KL*sizeof( float ) );
    rec = MALLOC( NN*S*sizeof( float ) );
    rot = MALLOC( NN*S*sizeof( float ) );
    cor = MALLOC( NN*S*sizeof( float ) );
    nrm = MALLOC( NN*S*sizeof( float ) );
    rcn = MALLOC( NN*S*sizeof( float ) );
    sen = MALLOC( T*Q*sizeof( float ) );
    ise = MALLOC( T*NN*S*sizeof( unsigned char ) );
    ihb = MALLOC( T*NN*S*sizeof( unsigned char ) );

FREAD( sci, sizeof( float ), M*KL, scin );                   /* Read in */
    FREAD( rot, sizeof( float ), NN*S, stan );

if( pflag == 1 )                                   /* Smooth projections */
        SM2( sci, prj );

for( j=0; j<N; j++ )                                         /* Reorganise */
        for( i=0; i<N; i++ )
            for( s=0; s<S; s++ )
                rec[j*NS+i*S+s] = rot[s*NN+i*N+j];

psf = PSF( sen, ise, ihb );                        /* Calculate P S F */ if( dflag == 1 )                                   /* Read original */
    {
        obj = MALLOC( NN*S*sizeof( float ) );

FREAD( rot, sizeof( float ), NN*S, objn );

for( j=0; j<N; j++ )                                     /* Reorganise */
            for( i=0; i<N; i++ )
                for( s=0; s<S; s++ )
                    obj[j*NS+i*S+s] = rot[s*NN+i*N+j];

sprintf( fulln, "%s.dev", basen );             /* Deviation file */
        devf = FOPEN( fulln, "wt" );
    }

/*====== 4) Reconstruction =======================================*/ for( i=0; i<I; i++ )                               /* Loop over iteration */
    {
        printf( "Iteration %i von %i\n", i+1, I );

ticks = clock();

if( dflag == 1 )                               /* Log-likelihood */
            llh = 0;

if( vflag == 1 )                               /* Smooth reconstruction */
            SM3( rec, rot );

SET_FLT( cor, NN*S, 0 );                       /* Initialise */
        SET_FLT( nrm, NN*S, 0 );

for( m=0; m<M; m++ )                           /* Loop over angle */
        {
            fprintf( stderr, "%4i", m+1 );

SET_FLT( rot, NN*S, 0 );                   /* Rotate object */
            ROT( rot, rec, -m*W/M );

if( aflag == 0 )                           /* Project */
                SUM( prj, rot, sen, ise, psf, ihb );
            else
                PRJ( prj, rot, sen, ise, psf, ihb );

if( dflag == 1 )
                llh += LLH( prj, sci, m );             /* Log likelihood */
```

```
        QUO( prj, sci, m );                          /* Quotient */

REP( rot, ron, prj, sen, ise );              /* back-project */

ROT( cor, rot, m*W/M );                      /* back-rotate */
        ROT( nrm, ron, m*W/M );
    }

NRM( cor, nrm );                                 /* Standardise factor */ if( vflag == 1 )                                 /* Smooth factor */
        SM3( cor, rot );

COR( rec, cor );                                 /* Correction step */ printf( "\nDauer: %g\n\n", (float)(clock()-ticks)/CLOCKS_PER_SEC );

if( dflag == 1 )
        DEV( devf, obj, rec, llh, i+1 );             /* Deviation */ if( (i+1)%nsave == 0 )                           /* Save */
        SAV( rec, rot, basen, i+1 );
    }

SAV( rec, rot, basen, I );                       /* Always last*/
}
/*******************************************************************
    PSF(): Calculates the sensitivity and the point-pattern
           width for the entire reconstruction volume
*******************************************************************/
float *PSF( float *sen, unsigned char *ise, unsigned char *ihb )
{
    unsigned char *pis, *pih;
    int s, i, j, h, k, l, t, Km1, Lm1;
    float x0, y0, z0, x1, y1, y3, z3, X2, Z3, xlq, rdq, mrq;
    float Lm1d2, Km1d2, AdP, mdP, pmdP, oy, oz, dy, dz;
    float de, fac, smi, sma, hmi, hma, hwb, *tse, *pts, *pse;
    float xv, yv, zv, Yv, Zv, xvq, yvq, xr, yr, zr, br, xvr, yvr;
    float del, coa, cob, cog, bvq, bv, skp, nww, sum;
    float pma, pmq, mpl, mlq, dq, hdq, req, *psf;

Km1d2 = (K-1)/2.0;
    Lm1d2 = (L-1)/2.0;                               /* Constants */
    Km1   = K - 1;
    Lm1   = L - 1;

x0 = -p*(N-1)/2.0;
    y0 = -p*(N-1)/2.0;                               /* Lower corner of FOV */
    z0 = -p*(S-1)/2.0;

req = res*res;                                   /* Square of intrinsic */
    mrq = p*p*N*N/4.0;                               /* Square of FOV radius */ hmi =  FLT_MAX;
    hma = -FLT_MAX;                                  /* Min and max of HWB */ for( t=0; t<T; t++ )                             /* Estimate min/max */
    {
        mpl = (A-x0)/(x2[t]-x0);                     /* Min enlargement */
        pma = p*(mpl - 1);
        mlq = mpl*mpl;
        pmq = pma*pma;

dq = hd[t]*hd[t]*mlq;
        dq = dq*cos( alf[t]/2 );                     /* Min point-pattern width */
        dq = dq + pmq + req;
        hwb = sqrt( dq )/P;

if( hwb < hmi )
            hmi = hwb;

mpl = (A+x0)/(x2[t]+x0);
        pma = p*(mpl - 1);                           /* Max enlargement */
        mlq = mpl*mpl;
        pmq = pma*pma;

xr = 1;                                      /* Angle PH/crystal */
```

```
        yr  = tan( psi[t] );
        zr  = tan( the[t] );
        br  = sqrt( 1 + yr*yr + zr*zr );
        del = acos( xr/br );

dq = hd[t]*hd[t]*mlq;                    /* Maximum point-pattern width */
        dq = dq + pmq;
        dq = dq/cos( del + alf[t]/2 );
        dq = dq + req;
        hwb = sqrt( dq )/P;

if( hwb > hma )
            hma = hwb;
    }

C = U*hma;                                   /* Dimension of the PSF */
    if( C%2 == 0 )
        C++;
    CC  = C*C;
    Cd2 = C/2;

psf = MALLOC( Q*CC*sizeof( float ) );        /* PSF memory */ for( h=0; h<Q; h++ )                         /* Occupy PSF*/
    {
        sum = 0;
        hwb = hmi + h*(hma-hmi)/(Q-1);

for( l=-Cd2; l<=Cd2; l++ )
            for( k=-Cd2; k<=Cd2; k++ )
                if( l*l + k*k <= U*U*hwb*hwb/4 )   /* max 98.7% */
                {
                    psf(h,l,k) = exp( -2.772589*(l*l + k*k)/(hwb*hwb) );
                    sum = sum + psf(h,l,k);
                }
                else
                {
                    psf(h,l,k) = 0;
                } for( k=-Cd2; k<=Cd2; k++ )                 /* Standardise */
            for( l=-Cd2; l<=Cd2; l++ )
                psf(h,l,k) = psf(h,l,k)/sum;
    } tse = MALLOC( NN*S*sizeof( float ) );  /* temporary sensitivity field */ pse = sen;
    pis = ise;
    pih = ihb;

for( t=0; t<T; t++ )                        /* Loop over pinholes */
    {
        fprintf( stderr, "Calculating the PSF: %i/%i\r", t+1, T );

de  = sqrt( hd[t]*(hd[t] + 2*tan( alf[t]/2 )/amu[t]) );
        fac = 10000*gin*de*de/16;
        hdq = hd[t]*hd[t];

oy = y2[t]/P + Lmld2;                    /* Prepare */
        oz = z2[t]/P + Kmld2;
        dy = y2[t] - y0;
        dz = z2[t] - z0;
        AdP = (A - x2[t])/P;
        X2  = x2[t];

xv = x0 - X2;                            /* Connection vector */
        Yv = y0 - y2[t];
        Zv = z0 - z2[t];

xr = -1;                                 /* Direction of PH axis */
        yr = -tan( psi[t] );
        zr = -tan( the[t] );
        br = sqrt( 1 + yr*yr + zr*zr );
        xr = xr/br;
        yr = yr/br;
        zr = zr/br;
```

```
coa = cos( alf[t]/2 );                    /* Cos. Of PH opening */ x1 = x0;                                   /* Initialise */
pts = tse;
smi = FLT_MAX;
sma = -FLT_MAX;

for( j=0; j<N; j++ )
{
   mpl = (A-x1)/(X2-x1);
   pma = p*(mpl - 1);
   mlq = mpl*mpl;
   pmq = pma*pma;                          /* Projection of lower corner */
   mdP = AdP/(X2-x1);
   y3 = mdP*dy + oy;
   Z3 = mdP*dz + oz;
   pmdP = p*mdP;

xlq = x1*x1;
   y1 = y0;

yv = Yv;
   xvq = xv*xv;
   xvr = xv*xr;

for( i=0; i<N; i++ )
   {
      l = floor( y3 );
      z3 = Z3;

rdq = xlq + y1*y1;

zv = Zv;
      yvq = yv*yv;
      yvr = yv*yr;

for( s=0; s<S; s++ )
      {
         if( rdq < mrq )                   /* inside FOV? */
         {
            k = floor( z3 );

if( l>=0 && l<Lml && k>=0 && k<Kml )   /* In Prj? */
            {
               bvq = xvq + yvq + zv*zv;
               skp = xvr + yvr + zv*zr;
               bv = sqrt( bvq );
               cob = skp/bv;

if( cob >= coa )            /* in PH (Pinhole) */
               {
                  cog = -xv/bv;            /* Angle plumb line */
                  nww = 1 - exp( -cmu*cth/cog ); /* Deviation of angle */

*pts = fac*nww*cob/bvq;  /* Sensitivity */ if( *pts < smi )         /* Min/max of sensitivity */
                     smi = *pts;
                  if( *pts > sma )
                     sma = *pts;

dq = hdq*mlq;            //* enlarge pinhole */
                  dq = dq*cob;             /* angle to pinhole */
                  dq = dq + pmq;           /* voxel extension */
                  dq = dq/cog;             /* angle to crystal */
                  dq = dq + req;           /* Intrinsic resolution */ hwb = sqrt( dq )/P;      /* Point-pattern width */

*pih = (Q-1)*(hwb-hmi)/(hma-hmi) + 0.5;
               }
               else
               {
                  *pts = 0;
                  *pih = 255;
               }
            }
            else
```

```
                {
                   *pts = 0;
                   *pih = 255;
                }
             }
             else
             {
                *pts = 0;
                *pih = 255;
             } z3 -= pmdP;
             zv += p;
             pts++;
             pih++;
          } y1 += p;
          y3 -= pmdP;
          yv += p;
       } x1 += p;
       xv += p;
    } for( h=0; h<Q; h++ )                              /* Sensitivity */
    {
       *pse = smi + h*(sma-smi)/(Q-1);

pse++;
    } for( i=0; i<NN*S; i++ )                           /* Indices of sensitivity */
    {
       if( tse[i] > 0 )
          *pis = (Q-1)*(tse[i]-smi)/(sma-smi) + 0.5;
       else
          *pis = 255;

pis++;
    }
 } printf( "\n\n" );

FREE( tse );

return psf;
}
/******************************************************************
    SUM(): Simple central ray projection plus folding with mean imaging function.
The projection takes into account the position-dependent sensitivity
******************************************************************/ void SUM( float *prj, float *rot, float *sen, unsigned char *ise,
          float *psf, unsigned char *ihb )
{
    unsigned char *pis, *pih;
    int s, i, j, k, l, t, kk, ll, lK, idx;
    float x1, y3, z3, Z3;
    float Nmld2, Smld2, Lmld2, Kmld2, AdP, pmdP;
    float DY, DZ, w1, w2, w3, w4, tmp, mih, sum;
    float oy, oz, dy, dz, X2, *tpr, *ppr, *pro;
    float *pse, *ppf, *Ppf;

SET_FLT( prj, KL, 0 );                            /* set zero projection */ tpr = MALLOC( KL*sizeof( float ) );               /* temporary projection */

Nmld2 = (N-1)/2.0;                                /* constants */
    Smld2 = (S-1)/2.0;
    Kmld2 = (K-1)/2.0;
    Lmld2 = (L-1)/2.0;

pis = ise;
    pih = ihb;
```

```
pse = sen;

for( t=0; t<T; t++ )                        /* Loop over pinholes */
{
   SET_FLT( tpr, KL, 0 );                   /* set zero projection */ oy = y2[t]/P + Lm1d2;
   oz = z2[t]/P + Km1d2;
   dy = y2[t]/p + Nm1d2;
   dz = z2[t]/p + Sm1d2;

AdP = (A - x2[t])/P;
   X2  = x2[t]/p;

x1 = -Nm1d2;
   pro = rot;

mih = 0;
   sum = 0;

for( j=0; j<N; j++ )
   {
      pmdP = AdP/(X2-x1);                   /* Projection of lower corner*/
      y3 = pmdP*dy + oy;
      Z3 = pmdP*dz + oz;

for( i=0; i<N; i++ )
      {
         l = floor( y3 );
         DY = y3 - l;

z3 = Z3;

lK = l*K;

for( s=0; s<S; s++ )
         {
            tmp = *pro;                     /* Objection value*/ if( *pis < 255 && tmp > 0 )
            {
               tmp = tmp*pse[*pis];         /* Associated sensitivity */
               k   = floor( z3 );
               DZ  = tmp*(z3 - k);

w4 = DY*DZ;                  /* Weights */
               w2 = tmp*DY - w4;
               w3 = DZ - w4;
               w1 = tmp - DZ - w2;

ppr = tpr + lK + k;          /* total */
               (*ppr) += w1;

ppr += 1;
               (*ppr) += w3;

ppr += K;
               (*ppr) += w4;

ppr -= 1;
               (*ppr) += w2;

mih += tmp*(*pih);           /* average PSF */
               sum += tmp;
            } z3 -= pmdP;
            pro++;
            pis++;
            pih++;
         } y3 -= pmdP;
      } x1++;
   }
}
```

```
        idx = mih/sum + 0.5;                              /* mean index */
        ppf = psf + idx*CC;                               /* mean PSF*/ ppr = tpr;

for( l=0; l<L; l++ )                              /* folding */
           for( k=0; k<K; k++ )
           {
              if( *ppr > 0 )
              {
                 Ppf = ppf;

for( ll=l-Cd2; ll<=l+Cd2; ll++ )
                    for( kk=k-Cd2; kk<=k+Cd2; kk++ )
                    {
                       if( *Ppf>0 && ll>=0 && ll<L && kk>=0 && kk<K )
                          prj(ll,kk) += (*ppr)*(*Ppf);

Ppf++;
                    }
              } ppr++;
           } pse += Q;
     }

FREE( tpr );
  }
/*******************************************************************
   PRJ(): Projection with voxel-wise inclusion of sensitivity and imaging
   function
*******************************************************************/ void PRJ( float *prj, float *rot, float *sen, unsigned char *ise,
          float *psf, unsigned char *ihb )
{
   unsigned char *pis, *pih;
   int s, i, j, k, l, t, kk, ll;
   int l0, l1, k0, k1, l0K, Lml, Kml;
   float x1, y3, z3, Z3;
   float Nml d2, Sml d2, Lml d2, Kml d2, AdP, pmdP;
   float DY, DZ, w1, w2, w3, w4, tmp;
   float oy, oz, dy, dz, X2, *pro, *ppf, *pse;
   float *pp0, *pp1, *pp2, *pp3, *pp4;

SET_FLT( prj, KL, 0 );                                 /* set zero projection */

Nml d2 = (N-1)/2.0;                                    /* Constants */
   Sml d2 = (S-1)/2.0;
   Kml d2 = (K-1)/2.0;
   Lml d2 = (L-1)/2.0;
   Kml   = K - 1;
   Lml   = L - 1;

pis = ise;
   pih = ihb;
   pse = sen;

for( t=0; t<T; t++ )                                   /* Loop over pinholes */
   {
      oy = y2[t]/P + Lml d2;
      oz = z2[t]/P + Kml d2;
      dy = y2[t]/p + Nml d2;
      dz = z2[t]/p + Sml d2;

AdP = (A - x2[t])/P;
      X2  = x2[t]/p;

x1 = -Nml d2;
      pro = rot;

for( j=0; j<N; j++ )
      {
         pmdP = AdP/(X2-x1);                              /* Projection of the lower corner */
         y3 = pmdP*dy + oy;
         z3 = pmdP*dz + oz;
```

```
for( i=0; i<N; i++ )
{
   l  = floor( y3 );
   DY = y3 - l;
   l0 = l - Cd2;
   l1 = l + Cd2;

z3 = Z3;

l0K = l0*K;

for( s=0; s<S; s++ )
   {
      tmp = *pro;                                    /* Object value */ if( *pis < 255 && tmp > 0 )
      {
         tmp = tmp*pse[*pis];        /* associated sensitivity */
         k   = floor( z3 );
         DZ  = tmp*(z3 - k);
         k0  = k - Cd2;
         k1  = k + Cd2;

w4 = DY*DZ;                                 /* weights */
         w2 = tmp*DY - w4;
         w3 = DZ - w4;
         w1 = tmp - DZ - w2;

ppf = psf + (*pih)*CC;                      /* add PSF */
         pp0 = prj + l0K + k0;

for( ll=l0; ll<=l1; ll++ )
         {
            pp1 = pp0;
            pp2 = pp0 + K;
            pp3 = pp0 + 1;
            pp4 = pp2 + 1;

for( kk=k0; kk<=k1; kk++ )
            {
               if( *ppf > 0 )
               {
                  if( ll>=0 && ll<L && kk>=0 && kk<K )
                     *pp1 += w1*(*ppf);
                  if( ll>=-1 && ll<Lm1 && kk>=0 && kk<K )
                     *pp2 += w2*(*ppf);
                  if( ll>=0 && ll<L && kk>=-1 && kk<Km1 )
                     *pp3 += w3*(*ppf);
                  if( ll>=-1 && ll<Lm1 && kk>=-1 && kk<Km1 )
                     *pp4 += w4*(*ppf);
               } ppf++;
               pp1++;
               pp2++;
               pp3++;
               pp4++;
            } pp0 += K;
         }
      } z3 -= pmdP;
      pro++;
      pis++;
      pih++;
   } y3 -= pmdP;
} x1++;
} pse += Q;
}
```

```
}
/******************************************************************
    QUO(): Forms the quotient from the measured and calculated projections. prj ( ) and
    sci ( ) have a different memory organisation.
******************************************************************/ void QUO( float *prj, float *sci, int m )
{
    int k, l;

for( l=0; l<L; l++ )
        for( k=0; k<K; k++ )
        {
            if( sci(m,k,l) > 0 && prj(l,k) > 0 )
                prj(l,k) = sci(m,k,l)/prj(l,k);
            else
                prj(l,k) = 1;
        }
}
/******************************************************************
    REP(): Projects the suggested corrections back into the (rotated) reconstruction.
    This occurs taking into consideration the position-dependent sensitivity.

******************************************************************/ void REP( float *rot, float *ron, float *prj, float *sen,
          unsigned char *ise )
{
    unsigned char *pis;
    int s, i, j, k, l, t, lK;
    float x1, y3, z3, Z3;
    float Nm1d2, Sm1d2, Lm1d2, Km1d2, AdP, pmdP;
    float DY, DZ, w1, w2, w3, w4, tmp, quo;
    float oy, oz, dy, dz, X2, *pro, *prn, *ppr, *pse;

Nm1d2 = (N-1)/2.0;                              /* Constants */
    Sm1d2 = (S-1)/2.0;
    Km1d2 = (K-1)/2.0;
    Lm1d2 = (L-1)/2.0;

pis = ise;
    pse = sen;

for( i=0; i<NN*S; i++ )                         /* Mark exterior space */
        if( rot[i] > 0 )
            rot[i] = 0;
        else
            rot[i] = -1;

SET_FLT( ron, NN*S, 0 );                        /* initialise */ for( t=0; t<T; t++ )                            /* Loop over pin holes */
    {
        oy = y2[t]/P + Lm1d2;
        oz = z2[t]/P + Km1d2;
        dy = y2[t]/p + Nm1d2;
        dz = z2[t]/p + Sm1d2;

AdP = (A - x2[t])/P;
        X2  = x2[t]/p;

x1 = -Nm1d2;
        pro = rot;
        prn = ron;

for( j=0; j<N; j++ )
        {
            pmdP = AdP/(X2-x1);                     /* Projection of the lower corner */
            y3 = pmdP*dy + oy;
            Z3 = pmdP*dz + oz;

for( i=0; i<N; i++ )
            {
                l = floor( y3 );
                DY = y3 - l;

z3 = Z3;
```

```
                lK = l*K;

for( s=0; s<S; s++ )
                {
                   if( *pis < 255 && *pro != -1 )
                   {
                      k  = floor( z3 );
                      DZ = z3 - k;

w4 = DY*DZ;                          /* Weights. */
                      w2 = DY - w4;
                      w3 = DZ - w4;
                      w1 = 1 - DZ - w2;

ppr = prj + lK + k;                  /* mean quotient */
                      quo = w1*(*ppr);

ppr += 1;
                      quo += w3*(*ppr);

ppr += K;
                      quo += w4*(*ppr);

ppr -= 1;
                      quo += w2*(*ppr);

tmp = pse[*pis];                     /* sensitivity */
                      *pro += tmp*quo;                     /* Correction factor */
                      *prn += tmp;                         /* standardisation */
                   } z3 -= pmdP;
                   pro++;
                   prn++;
                   pis++;
                } y3 -= pmdP;
             } xl++;
          } pse += Q;
       }
   }
   /**************************************************************************
       COR(): Standardisation of the correction factors
   **************************************************************************/
   void NRM( float *cor, float *nrm )
   {
      int i;

for( i=0; i<NN*S; i++ )
         if( nrm[i] > 0 )
            cor[i] = cor[i]/nrm[i];
   }
   /**************************************************************************
       COR(): Use of correction factors on the current reconstruction
   **************************************************************************/
   void COR( float *rec, float *cor )
   {
      int i;

for( i=0; i<NN*S; i++ )
         if( rec[i] > 0 )
            rec[i] = cor[i]*rec[i];
   }
   /**************************************************************************
       SAV(): Re-organisation and storing the date
   **************************************************************************/
   void SAV( float *rec, float *rot, char *basen, int iter )
   {
      char fulln[256];
```

```c
    int i, j, s;

for( s=0; s<S; s++ )                                    /* reorganise */
        for( i=0; i<N; i++ )
            for( j=0; j<N; j++ )
                rot[s*NN+i*N+j] = rec[j*NS+i*S+s];

sprintf( fulln, "%s.r%2.2i", basen, iter );             /* Name */

FWRITE( rot, sizeof( float ), NN*S, fulln );            /* Save */

}
/********************************************************************
   ROT(): Rotates the object "ccw" around the angle "phi". The objects must have
   inverse memory organisation (j.i.s.). Note: the target volume is not initialised
   in ROT ( )
********************************************************************/ void ROT( float *rot, float *rec, float phi )
{
    int i, j, s, k, l, ifac;
    float si, co, i2sico, ta, ct, Nd2, Nd2m1, tmp;
    float x, y, F[9], a[2], b[2], c[2], d[2], r, t;
    float A0, A1, B0, B1, C0, C1, D0, D1, fac, ox, oy, *pre;
    float *pr1, *pr2, *pr3, *pr4, *pr5, *pr6, *pr7, *pr8, *pr9;

fac = phi/(2*M_PI);                                     /* Reduce to 2*Pi */
    ifac = fac;
    fac = fac - ifac;
    phi = 2*fac*M_PI;

if( phi < 0 )                                           /* Convert to negative */
        phi = 2*M_PI + phi;

if( phi == 0 )                                          /* multiple of Pi/2 */
    {
        for( j=0; j<N; j++ )
            for( i=0; i<N; i++ )
                for( s=0; s<S; s++ )
                    if( rec(j,i,s) > 0 )
                        rot(j,i,s) += rec(j,i,s);

return;
    } if( phi == M_PI/2 )
    {
        for( j=0; j<N; j++ )
            for( i=0; i<N; i++ )
                for( s=0; s<S; s++ )
                    if( rec(i,N-j-1,s) > 0 )
                        rot(j,i,s) += rec(i,N-j-1,s);

return;
    } if( phi == M_PI )
    {
        for( j=0; j<N; j++ )
            for( i=0; i<N; i++ )
                for( s=0; s<S; s++ )
                    if( rec(N-j-1,N-i-1,s) > 0 )
                        rot(j,i,s) += rec(N-j-1,N-i-1,s);

return;
    } if( phi == 3*M_PI/2 )
    {
        for( j=0; j<N; j++ )
            for( i=0; i<N; i++ )
                for( s=0; s<S; s++ )
                    if( rec(N-i-1,j,s) > 0 )
                        rot(j,i,s) += rec(N-i-1,j,s);

return;
    }
```

```
Nd2 = N/2.0;
Nd2m1 = Nd2 - 1;
si = sin( phi );
co = cos( phi );

if( 0 < phi && phi < M_PI/2 )                        /* which quadrant? */
{
   A0 = -Nd2*(co - si);
   A1 = -Nd2*(si + co);

ox = -si;
   oy = co;
} if( M_PI/2 < phi && phi < M_PI )
{
   A0 = -Nd2*co + Nd2m1*si;
   A1 = -Nd2*si - Nd2m1*co;

phi = phi - M_PI/2;
   si = sin( phi );
   co = cos( phi );

ox = -co;
   oy = -si;
} if( M_PI < phi && phi < 3*M_PI/2 )
{
   A0 = -Nd2m1*(co - si);
   A1 = -Nd2m1*(si + co);

phi = phi - M_PI;
   si = sin( phi );
   co = cos( phi );

ox = si;
   oy = -co;
} if( 3*M_PI/2 < phi && phi < 2*M_PI )
{
   A0 = -Nd2m1*co + Nd2*si;
   A1 = -Nd2m1*si - Nd2*co;

phi = phi - 3*M_PI/2;
   si = sin( phi );
   co = cos( phi );

ox = co;
   oy = si;
}

B0 = A0 - si;
B1 = A1 + co;
C0 = B0 + co;
C1 = B1 + si;
D0 = C0 + si;
D1 = C1 - co;

i2sico = 1/(2*si*co);
ta = si/co;
ct = 1/ta;

pre = rec;

for( j=0; j<N; j++ )                                 /* Rotate object */
{
   a[0] = A0;
   a[1] = A1;
   b[0] = B0;
   b[1] = B1;
   c[0] = C0;
   c[1] = C1;
   d[0] = D0;
   d[1] = D1;

for( i=0; i<N; i++ )
```

```
        {
            x = 0.5*( a[0] + c[0] );
            y = 0.5*( a[1] + c[1] );
            r = floor( y );
            t = floor( x );
            k = r + Nd2;
            l = t + Nd2;

pr5 = rot + l*NS + k*S;

PIX( F, a, b, c, d, r, t, i2sico, ta, ct );

for( s=0; s<S; s++ )
            {
                tmp = *pre;

if( tmp > 0 )
                {
                    pr2 = pr5 - S;
                    pr8 = pr5 + S;
                    pr4 = pr5 - NS;
                    pr1 = pr4 - S;
                    pr7 = pr4 + S;
                    pr6 = pr5 + NS;
                    pr3 = pr6 - S;
                    pr9 = pr6 + S;

*pr1 += F[0]*tmp;
                    *pr2 += F[1]*tmp;
                    *pr3 += F[2]*tmp;
                    *pr4 += F[3]*tmp;
                    *pr5 += F[4]*tmp;
                    *pr6 += F[5]*tmp;
                    *pr7 += F[6]*tmp;
                    *pr8 += F[7]*tmp;
                    *pr9 += F[8]*tmp;
                } pre++;
                pr5++;
            } a[0] += ox;
            a[1] += oy;
            b[0] += ox;
            b[1] += oy;
            c[0] += ox;
            c[1] += oy;
            d[0] += ox;
            d[1] += oy;
        }

A0 += oy;
        A1 -= ox;
        B0 += oy;
        B1 -= ox;
        C0 += oy;
        C1 -= ox;
        D0 += oy;
        D1 -= ox;
    }
}
/**********************************************************************
    RAY(): Calculate the interfaces between a rotating pixel and the three projection
    rays above.
**********************************************************************/
void RAY( float *V, float *H, float *a, float *b, float *c, float *d,
          float r, float t, float i2sico )
{
    float d1, d2, d3, rp1, tp1;

rp1 = r + 1;
    tp1 = t + 1;

if( c[1] > rp1 )
    {
        d2 = c[1] - rp1;
```

```
    if( b[1] > rp1 )
    {
        d1 = b[1] - rp1;
        V[2] = (d2*d2-d1*d1)*i2sico;
    }
    else
    {
        if( d[1] > rp1 )
        {
            d3 = d[1] - rp1;
            V[2] = (d2*d2-d3*d3)*i2sico;
        }
        else
        {
            V[2] = d2*d2*i2sico;
        }
    }
}
else
{
    V[2] = 0;
} if( a[1] < r )
{
    d2 = r - a[1];

if( d[1] < r )
    {
        d1 = r - d[1];
        V[0] = (d2*d2-d1*d1)*i2sico;
    }
    else
    {
        if( b[1] < r )
        {
            d3 = r - b[1];
            V[0] = (d2*d2-d3*d3)*i2sico;
        }
        else
        {
            V[0] = d2*d2*i2sico;
        }
    }
}
else
{
    V[0] = 0;
}

V[1] = 1 - V[0] - V[2];

if( b[0] < t )
{
    d2 = t - b[0];

if( a[0] < t )
    {
        d1 = t - a[0];
        H[0] = (d2*d2-d1*d1)*i2sico;
    }
    else
    {
        if( c[0] < t )
        {
            d3 = t - c[0];
            H[0] = (d2*d2-d3*d3)*i2sico;
        }
        else
        {
            H[0] = d2*d2*i2sico;
        }
    }
}
else
{
    H[0] = 0;
```

```
        }
    if( d[0] > tp1 )
    {
        d2 = d[0] - tp1;

if( c[0] > tp1 )
        {
            d1 = c[0] - tp1;
            H[2] = (d2*d2-d1*d1)*i2sico;
        }
        else
        {
            if( a[0] > tp1 )
            {
                d3 = a[0] - tp1;
                H[2] = (d2*d2-d3*d3)*i2sico;
            }
            else
            {
                H[2] = d2*d2*i2sico;
            }
        }
    }
    else
    {
        H[2] = 0;
    }

H[1] = 1 - H[0] - H[2];
}
/******************************************************************
    PIX() Calculates the interfaces between the rotating pixel and the nine pixels
    below of a non-rotating grid
******************************************************************/
void PIX( float *F, float *a, float *b, float *c, float *d, float r,
          float t, float i2sico, float ta, float ct )
{
    float dx, dy, v, h, V[3], H[3], tp1, rp1;

tp1 = t + 1;
    rp1 = r + 1;

F[0] = F[2] = F[6] = F[8] = 0;

RAY( V, H, a, b, c, d, r, t, i2sico );

if( a[0] <= t && a[1] <= r )                              /* Case 1 and 2 */
    {
        dx = t - a[0];
        dy = r - a[1];
        v = dy - dx*ta;
        if( v > 0 )
        {
            h = dx + dy*ta;
            F[0] = 0.5*( v*dx + h*dy );
        }
        else
            F[0] = dy*dy*i2sico;
    } if( b[0] <= t && b[1] <= r )                              /* Case 3 and 4 */
    {
        dx = t - b[0];
        dy = r - b[1];
        h = dx - dy*ct;
        if( h > 0 )
        {
            v = dy + dx*ct;
            F[0] = 0.5*( v*dx + h*dy );
        }
        else
            F[0] = dx*dx*i2sico;
    } if( a[0] > t && a[1] <= r && b[0] <= t && b[1] > r )      /* Case 5 */
    {
```

```
      dx = a[0] - t;
      dy = r - a[1];
      v = dy - dx*ct;
      if( v > 0 )
         F[0] = 0.5*v*v*ta;
} if( b[0] <= t && b[1] > rp1 )                    /* Top, left corner */
{
   dx = t - b[0];
   dy = b[1] - rp1;
   h = dx - dy*ct;
   if( h > 0 )
   {
      v = dy + dx*ta;
      F[6] = 0.5*( v*dx + h*dy );
   }
   else
      F[6] = dx*dx*i2sico;
} if( c[0] <= t && c[1] > rp1 )
{
   dx = t - c[0];
   dy = c[1] - rp1;
   v = dy - dx*ct;
   if( v > 0 )
   {
      h = dx + dy*ct;
      F[6] = 0.5*( v*dx + h*dy );
   }
   else
      F[6] = dy*dy*i2sico;
} if( b[0] <= t && b[1] <= rp1 && c[0] > t && c[1] > rp1 )
{
   dx = t - b[0];
   dy = rp1 - b[1];
   h = dx - dy*ct;
   if( h > 0 )
      F[6] = 0.5*h*h*ta;
} if( c[0] > tp1 && c[1] > rp1 )                   /* Top, right corner */
{
   dx = c[0] - tp1;
   dy = c[1] - rp1;
   v = dy - dx*ta;
   if( v > 0 )
   {
      h = dx + dy*ta;
      F[8] = 0.5*( v*dx + h*dy );
   }
   else
      F[8] = dy*dy*i2sico;
} if( d[0] > tp1 && d[1] > rp1 )
{
   dx = d[0] - tp1;
   dy = d[1] - rp1;
   h = dx - dy*ct;
   if( h > 0 )
   {
      v = dy + dx*ct;
      F[8] = 0.5*( v*dx + h*dy );
   }
   else
      F[8] = dx*dx*i2sico;
} if( c[0] <= tp1 && c[1] > rp1 && d[0] > tp1 && d[1] <= rp1 )
{
   dx = tp1 - c[0];
   dy = c[1] - rp1;
   v = dy - dx*ct;
   if( v > 0 )
```

```
            F[8] = 0.5*v*v*ta;
   } if( d[0] > tp1 && d[1] <= r )                    /* Bottom,right corner*/
   {
      dx = d[0] - tp1;
      dy = r - d[1];
      h = dx - dy*ta;
      if( h > 0 )
      {
         v = dy + dx*ta;
         F[2] = 0.5*( v*dx + h*dy );
      }
      else
         F[2] = dx*dx*i2sico;
   } if( a[0] > tp1 && a[1] <= r )
   {
      dx = a[0] - tp1;
      dy = r - a[1];
      v = dy - dx*ct;
      if( v > 0 )
      {
         h = dx + dy*ct;
         F[2] = 0.5*( v*dx + h*dy );
      }
      else
         F[2] = dy*dy*i2sico;
   } if( a[0] <= tp1 && a[1] <= r && d[0] > tp1 && d[1] > r )
   {
      dx = d[0] - tp1;
      dy = d[1] - r;
      h = dx - dy*ct;
      if( h > 0 )
         F[2] = 0.5*h*h*ta;
   }

F[1] = V[0] - F[0] - F[2];
   F[7] = V[2] - F[6] - F[8];
   F[3] = H[0] - F[0] - F[6];
   F[5] = H[2] - F[2] - F[8];
   F[4] = 1 - H[0] - H[2] - F[1] - F[7];
}
/******************************************************************
   SM2(): 2D-Smoothing (binomial) of the measured projections
*******************************************************************/
void SM2( float *sci, float *prj )
{
   int m, k, l, kk, ll, E, Ed2;
   float *kn2, sum;

E = 3;
   Ed2 = E/2;

kn2 = MALLOC( E*E*sizeof( float ) );              /* Core */ kn2(-1,-1) = kn2(-1,1) = kn2(1,-1) = kn2(1,1) = 1;
   kn2(-1,0) = kn2(0,-1) = kn2(0,1) = kn2(1,0) = 2;
   kn2(0,0) = 4;

for( m=0; m<M; m++ )                              /* Smoothing */
   {
      for( l=0; l<L; l++ )
         for( k=0; k<K; k++ )
         {
            sum = 0;
            prj(l,k) = 0;

for( kk=-Ed2; kk<=Ed2; kk++ )
               for( ll=-Ed2; ll<=Ed2; ll++ )
                  if( l+ll>=0 && l+ll<L && k+kk>=0 && k+kk<K )
                  {
                     sum += kn2(ll,kk);
                     prj(l,k) += kn2(ll,kk)*sci(m,k+kk,l+ll);
                  }
```

```c
            }
            prj(l,k) = prj(l,k)/sum;
        } for( l=0; l<L; l++ )                            /* transfer */
            for( k=0; k<K; k++ )
                sci(m,k,l) = prj(l,k);
    }

FREE( kn2 );
}
/****************************************************************
    SM3() 3D-, Smoothing (binomial) of a volume data record
****************************************************************/
void SM3( float *rec, float *rot )
{
    int s, i, j, h, k, l, E, Ed2, EE;
    float *kn3, sum;

E   = 3;
    Ed2 = E/2;
    EE  = E*E;

kn3 = MALLOC( EE*E*sizeof( float ) );                /* Core */
    SET_FLT( kn3, EE*E, 0 );

kn3(0,0,0)  = 2;
    kn3(0,0,-1) = 1;
    kn3(0,0,1)  = 1;
    kn3(0,-1,0) = 1;
    kn3(0,1,0)  = 1;
    kn3(-1,0,0) = 1;
    kn3(1,0,0)  = 1;

for( j=0; j<N; j++ )                                 /* Smoothing */
        for( i=0; i<N; i++ )
            for( s=0; s<S; s++ )
                if( rec(j,i,s) > 0 )
                {
                    sum = 0;
                    rot(j,i,s) = 0;

for( l=-Ed2; l<=Ed2; l++ )
                        for( k=-Ed2; k<=Ed2; k++ )
                            for( h=-Ed2; h<=Ed2; h++ )
                                if( rec(j+l,i+k,s+h)>0 && j+l>=0 && j+l<N && i+k>=0 && i+k<N && s+h>=0
&& s+h<S )
                                {
                                    sum += kn3(l,k,h);
                                    rot(j,i,s) += kn3(l,k,h)*rec(j+l,i+k,s+h);
                                } rot(j,i,s) = rot(j,i,s)/sum;
                } for( i=0; i<N*N*S; i++ )                             /* transfer */
        rec[i] = rot[i];

FREE( kn3 );
}
/****************************************************************
    LLH(): Calculates the Log-likelihood for one direction.
****************************************************************/
float LLH( float *prj, float *sci, int m )
{
    int k, l;
    float llh, tmp1, tmp2;

llh = 0;

for( l=0; l<L; l++ )
        for( k=0; k<K; k++ )
        {
            tmp1 = prj(l,k);
            tmp2 = sci(m,k,l);
```

```
        if( tmp1 > 0 && tmp2 > 0 )
           llh += tmp2*log(tmp1) - tmp1;
     } return llh;
}
/***********************************************************************
   DEV(): Calculates the mean square deviation between the object and
   the reconstruction
***********************************************************************/ void DEV( FILE *devf, float *obj, float *rec, float llh, int i )
{
   int k, cnt;
   float dev, tmp;

cnt = 0;
   dev = 0;

for( k=0; k<NN*S; k++ )
      if( rec[k] > 0 )
      {
         cnt++;
         tmp = obj[k] - rec[k];
         dev += tmp*tmp;
      } dev = dev/cnt;

fprintf( devf, "%7i%15.6g%15.6g\n", i, dev, llh );
   fflush( devf );
}
/***********************************************************************/

/***********************************************************************
   util.h                                         Author: Nils Schramm
                                                  Date:  10.12.1998

Header file to util.c
***********************************************************************/ ifndef __util__
define __util__ include <stdio.h>
include <stddef.h>
#include <stdlib.h>
#include <sys/stat.h>
#include <unistd.h>
#include <math.h>
#include <limits.h>
include <float.h> define TRUE  1
define FALSE 0 void   ERROR( char *text );
FILE  *FOPEN( char *name, char *mode );
void   REWIND( FILE *file );
void   FCLOSE( FILE *file );
int    FLEN_BIN( FILE *file );
void   FREAD( void *buffer, int size, int num, char *name );
void   FWRITE( void *buffer, int size, int num, char *name );
void   FAPPEND( void *buffer, int size, int num, char *name );
void  *MALLOC( int bytes );
void   FREE( void *ptr );
int    MAX_INT( int *data, int num );
int    MIN_INT( int *data, int num );
float  MAX_FLT( float *data, int num );
float  MIN_FLT( float *data, int num );
int    SUM_INT( int *data, int num );
float  SUM_FLT( float *data, int num );
void   SET_INT( int *data, int num, int val );
```

```c
void    SET_FLT( float *data, int num, float val );
void    COPY_INT( int *dest, int *sour, int num );
void    COPY_FLT( float *dest, float *sour, int num );
void    ADD_INT( int *dest, int *sour1, int *sour2, int num );
void    ADD_FLT( float *dest, float *sour1, float *sour2, int num );
void    SUB_INT( int *dest, int *sour1, int *sour2, int num );
void    SUB_FLT( float *dest, float *sour1, float *sour2, int num );
int     FLEN_ASC( FILE *file );
void    READ_INT( int *data, int nsli, int nrow, int ncol, char *name );
void    WRITE_INT( int *data, int nsli, int nrow, int ncol, char *name );
void    APPEND_INT( int *data, int nsli, int nrow, int ncol, char *name );
void    READ_FLT( float *data, int nsli, int nrow, int ncol, char *name );
void    WRITE_FLT( float *data, int nsli, int nrow, int ncol, char *name );
void    APPEND_FLT( float *data, int nsli, int nrow, int ncol, char *name );
int     IS_BIG_ENDIAN( void );
void    SWAP_TWO( char *chr1, char *chr2 );
void    SWAP( void *ptr, int size );

#endif

/*******************************************************************/

/*******************************************************************
    util.c                                      Author: Nils Schramm
                                                Date:   10.12.1998

Some useful resources.
*******************************************************************/ include "util.h"

/*******************************************************************
    ERROR(): Standard error handling
*******************************************************************/ void ERROR( char *text )
{
    fprintf( stderr, "\n%s\n", text );
    fprintf( stderr, "Exiting to system...\n\n" );
    exit( 0 );
}
/*******************************************************************
    FOPEN(): Open file.
*******************************************************************/

FILE *FOPEN( char *name, char *mode )
{
    FILE *file;

file = fopen( name, mode );
    if( file == NULL )
        ERROR( "FOPEN(): Can't open file" );

return file;
}
/*******************************************************************
    REWIND(): Rewind file.
*******************************************************************/ void REWIND( FILE *file )
{
    rewind( file );
}
/*******************************************************************
    FCLOSE(): Close file.
*******************************************************************/ void FCLOSE( FILE *file )
{
    fclose( file );
}
/*******************************************************************
    FLEN_BIN(): Determine the length of a file in bytes.
*******************************************************************/ int FLEN_BIN( FILE *file )
{
```

```c
    int len;
    struct stat fst;

fstat( fileno( file ), &fst );
    len = fst.st_size;

return len;
}
/****************************************************************
    FREAD(): Binary reading of Data.
****************************************************************/ void FREAD( void *buffer, int size, int num, char *name )
{
    int len;
    FILE *file;

file = FOPEN( name, "rb" );

len = FLEN_BIN( file );
    if( num*size != len )
        ERROR( "FREAD(): Wrong file size" );

fread( buffer, size, num, file );

FCLOSE( file );
}
/****************************************************************
    FWRITE(): Binary writing of data. New file is created.
****************************************************************/ void FWRITE( void *buffer, int size, int num, char *name )
{
    FILE *file;

file = FOPEN( name, "wb" );

fwrite( buffer, size, num, file );

FCLOSE( file );
}
/****************************************************************
    FAPPEND(): Binary writing of data. Data are appended to an existing file.
****************************************************************/ void FAPPEND( void *buffer, int size, int num, char *name )
{
    FILE *file;

file = FOPEN( name, "ab" );

fwrite( buffer, size, num, file );

FCLOSE( file );
}
/****************************************************************
    MALLOC(): Request memory
****************************************************************/ void *MALLOC( int bytes )
{
    void *ptr;

ptr = malloc( bytes );
    if( ptr == NULL )
        ERROR( "MALLOC(): Can't allocate memory" );

return ptr;
}
/****************************************************************
    FREE(): Release memory
****************************************************************/ void FREE( void *ptr )
{
    free( ptr );
}
```

```
/******************************************************************
   MAX_INT(): Determine the maximum of an integer data record.
******************************************************************/ int MAX_INT( int *data, int num )
{
   int i;
   int max;

max = INT_MIN;

for( i=0; i<num; i++ )
      if( data[i] > max )
         max = data[i];

return max;
}
/******************************************************************
   MIN_INT(): Determined the minimum of an integer data record.
******************************************************************/ int MIN_INT( int *data, int num )
{
   int i;
   int min;

min = INT_MAX;

for( i=0; i<num; i++ )
      if( data[i] < min )
         min = data[i];

return min;
}
/******************************************************************
   MAX_FLT(): Determine the maximum of a float data record.
******************************************************************/ float MAX_FLT( float *data, int num )
{
   int i;
   float max;

max = -FLT_MAX;

for( i=0; i<num; i++ )
      if( data[i] > max )
         max = data[i];

return max;
}
/******************************************************************
   MIN_FLT(): Determine the minimum of a float data record.
******************************************************************/ float MIN_FLT( float *data, int num )
{
   int i;
   float min;

min = FLT_MAX;

for( i=0; i<num; i++ )
      if( data[i] < min )
         min = data[i];

return min;
}
/******************************************************************
   SUM_INT(): Summates an integer data record.
******************************************************************/ int SUM_INT( int *data, int num )
{
   int i;
   int sum;

sum = 0;
```

```c
    for( i=0; i<num; i++ )
        sum = sum + data[i];

return sum;
}
/*****************************************************************
    SUM_FLT(): Summates a float data record.
*****************************************************************/ float SUM_FLT( float *data, int num )
{
    int i;
    float sum;

sum = 0;

for( i=0; i<num; i++ )
        sum = sum + data[i];

return sum;
}
/*****************************************************************
    SET_INT(): Initialises an integer data-record.
*****************************************************************/ void SET_INT( int *data, int num, int val )
{
    int i;

for( i=0; i<num; i++ )
        data[i] = val;
}
/*****************************************************************
    SET_FLT(): Initialises a float data record.
*****************************************************************/ void SET_FLT( float *data, int num, float val )
{
    int i;

for( i=0; i<num; i++ )
        data[i] = val;
}
/*****************************************************************
    COPY_INT(): Copies an integer data record.
*****************************************************************/ void COPY_INT( int *dest, int *sour, int num )
{
    int i;

for( i=0; i<num; i++ )
        dest[i] = sour[i];
}
/*****************************************************************
    COPY_FLT(): Copies a float data record.
*****************************************************************/ void COPY_FLT( float *dest, float *sour, int num )
{
    int i;

for( i=0; i<num; i++ )
        dest[i] = sour[i];
}
/*****************************************************************
    ADD_INT(): Adds two integer data records.
*****************************************************************/ void ADD_INT( int *dest, int *sour1, int *sour2, int num )
{
    int i;

for( i=0; i<num; i++ )
        dest[i] = sour1[i] + sour2[i];
}
/*****************************************************************
```

```
    ADD_FLT(): Adds two float data records.
*****************************************************************/ void ADD_FLT( float *dest, float *sour1, float *sour2, int num )
{
   int i;

for( i=0; i<num; i++ )
      dest[i] = sour1[i] + sour2[i];
}
/*****************************************************************
    SUB_INT(): Subtracts two integer data records.
*****************************************************************/ void SUB_INT( int *dest, int *sour1, int *sour2, int num )
{
   int i;

for( i=0; i<num; i++ )
      dest[i] = sour1[i] - sour2[i];
}
/*****************************************************************
    SUB_FLT(): Subtracts two float data records.
*****************************************************************/ void SUB_FLT( float *dest, float *sour1, float *sour2, int num )
{
   int i;

for( i=0; i<num; i++ )
      dest[i] = sour1[i] - sour2[i];
}
/*****************************************************************
    FLEN_ASC(): Determines the number of figures in an ASCII file.
*****************************************************************/ int FLEN_ASC( FILE *file )
{
   int status, cnt;
   float tmp;

cnt = 0;

while( 1 )
   {
      status = fscanf( file, "%g", &tmp );
      if( status == EOF )
         break;

cnt++;
   }

REWIND( file );

return cnt;
}
/*****************************************************************
    READ_INT(): Reads an ASCII data record into an integer matrix.
*****************************************************************/ void READ_INT( int *data, int nsli, int nrow, int ncol, char *name )
{
   int i, len;
   float tmp;
   FILE *file;

file = FOPEN( name, "rt" );

len = FLEN_ASC( file );
   if( nsli*nrow*ncol != len )
      ERROR( "READ_INT(): Wrong file size" );

for( i=0; i<nsli*nrow*ncol; i++ )
   {
      fscanf( file, "%g", &tmp );
      if( tmp >= 0 )
         data[i] = (int)tmp + 0.5;
      else
```

```
      data[i] = (int)tmp - 0.5;
   }

FCLOSE( file );
}
/******************************************************************
   WRITE_INT(): Writes an integer data record in ASCII format.
   New file is created.
******************************************************************/ void WRITE_INT( int *data, int nsli, int nrow, int ncol, char *name )
{
   int i, j, k;
   FILE *file;

file = FOPEN( name, "wt" );

for( k=0; k<nsli; k++ )
   {
      for( i=0; i<nrow; i++ )
      {
         for( j=0; j<ncol; j++ )
         {
            fprintf( file, "%i\t", data[k*nrow*ncol+i*ncol+j] );
         }
         fprintf( file, "\n" );
      }
      fprintf( file, "\n" );
   }

FCLOSE( file );
}
/******************************************************************
   APPEND_INT(): Writes an integer data-record in ASCII format.
   Data are appended to an existing file.
******************************************************************/ void APPEND_INT( int *data, int nsli, int nrow, int ncol, char *name )
{
   int i, j, k;
   FILE *file;

file = FOPEN( name, "at" );

for( k=0; k<nsli; k++ )
   {
      for( i=0; i<nrow; i++ )
      {
         for( j=0; j<ncol; j++ )
         {
            fprintf( file, "%i\t", data[k*nrow*ncol+i*ncol+j] );
         }
         fprintf( file, "\n" );
      }
      fprintf( file, "\n" );
   }

FCLOSE( file );
}
/******************************************************************
   READ_FLT(): Reads an ASCII data record into a float matrix.
******************************************************************/ void READ_FLT( float *data, int nsli, int nrow, int ncol, char *name )
{
   int i, len;
   float tmp;
   FILE *file;

file = FOPEN( name, "rt" );

len = FLEN_ASC( file );
   if( nsli*nrow*ncol != len )
      ERROR( "READ_FLT(): Wrong file size" );

for( i=0; i<nsli*nrow*ncol; i++ )
   {
      fscanf( file, "%g", &tmp );
```

```
      data[i] = tmp;
   }

FCLOSE( file );
}
/*****************************************************************
   WRITE_FLT(): Writes a float data record in ASCII format.  New file is created.
*****************************************************************/ void WRITE_FLT( float *data, int nsli, int nrow, int ncol, char *name )
{
   int i, j, k;
   FILE *file;

file = FOPEN( name, "wt" );

for( k=0; k<nsli; k++ )
   {
      for( i=0; i<nrow; i++ )
      {
         for( j=0; j<ncol; j++ )
         {
            fprintf( file, "%g\t", data[k*nrow*ncol+i*ncol+j] );
         }
         fprintf( file, "\n" );
      }
      fprintf( file, "\n" );
   }

FCLOSE( file );
}
/*****************************************************************
   APPEND_FLT(): Writes a float data-record in ASCII format.  Data are
   appended to existing file.
*****************************************************************/ void APPEND_FLT( float *data, int nsli, int nrow, int ncol, char *name )
{
   int i, j, k;
   FILE *file;

file = FOPEN( name, "at" );

for( k=0; k<nsli; k++ )
   {
      for( i=0; i<nrow; i++ )
      {
         for( j=0; j<ncol; j++ )
         {
            fprintf( file, "%g\t", data[k*nrow*ncol+i*ncol+j] );
         }
         fprintf( file, "\n" );
      }
      fprintf( file, "\n" );
   }

FCLOSE( file );
}
/*****************************************************************
   IS_BIG_ENDIAN(): Checks whether the system is big-endian or little-endian.
*****************************************************************/ int IS_BIG_ENDIAN( void )
{
   char *chr;
   short sht;
   int rtn;

sht = 0x0100;
   chr = (char *)&sht;
   rtn = *chr;

return rtn;
}
/*****************************************************************
   SWAP_TWO(): Exchanges two bytes (internal only).
*****************************************************************/
```

```c
void SWAP_TWO( char *chr1, char *chr2 )
{
    char tmp;

tmp = *chr1;
    *chr1 = *chr2;
    *chr2 = tmp;
}
/******************************************************************
    SWAP(): Changes the byte sequence of a variable.
******************************************************************/ void SWAP( void *ptr, int size )
{
    char *chr;

chr = (char *)ptr;

switch( size )
    {
        case 2:
            SWAP_TWO( chr, chr+1 );
            break;

case 4:
            SWAP_TWO( chr, chr+3 );
            SWAP_TWO( chr+1, chr+2 );
            break;

case 8:
            SWAP_TWO( chr, chr+7 );
            SWAP_TWO( chr+1, chr+6 );
            SWAP_TWO( chr+2, chr+5 );
            SWAP_TWO( chr+3, chr+4 );
            break;

default:
            ERROR( "SWAP(): Wrong size" );
    }
}
/******************************************************************/
```

The basic structure of the device is illustrated with reference to the drawing.

An object 1 is located closer to a multiple-pinhole collimator than the detector surface 2. The multiple-pinhole collimator 3 provides pinholes 4, which open in the shape of a funnel from both sides into the collimator 3, thereby allowing obliquely falling photons to pass through the pinholes. The tips 5 of the multiple-pinhole collimator 3 are made of iridium. The other regions of the multiple-pinhole collimator are made from tungsten. Photons 6 pass from the object 1 through the pinholes and onto the surface of the detector 2. The object 1 is therefore reproduced on the surface of the detector 2 in enlargement. Overlapping regions 7 are provided between the individual cones, formed by the photons.

In the drawing, the pinholes 4 are at a uniform distance from one another. In one embodiment of the invention, these distances are non-uniform.

The invention claimed is:

1. A device for the implementation of a tomographical method using single photon emission computed tomography comprising a multiple-pinhole collimator and a detector having a surface for registering photons or gamma quanta which pass through the multiple-pinhole collimator, wherein the detector together with the collimator is movable around a holder, the distance between the holder for the object to be imaged and the multiple-pinhole collimator is smaller than the distance between the multiple-pinhole collimator and the surface of the detector, and said device is arranged so that the photons or gamma quanta passing through the multiple-pinhole collimator form cones on the surface of the detector that always partially overlap.

2. A device according to claim 1, wherein the multiple-pinhole collimator is made from at least one metal selected from the group consisting of tungsten and iridium.

3. A device according to claim 1, wherein the multiple-pinhole collimator includes pinholes and regions formed of iridium adjacent to the pinholes.

4. A device according to claim 1, wherein the multiple-pinhole collimator includes pinholes and the pinholes open in a funnel shape from both sides into the multiple-pinhole collimator.

5. A device according to claim 1, wherein the multiple-pinhole collimator is made from at least one metal selected from the group consisting of tungsten and iridium, the multiple-pinhole collimator includes pinholes and regions formed of iridium adjacent to the pinholes, and the pinholes open in a funnel shape from both sides into the multiple-pinhole collimator.

6. A tomographical method using single photon emission computed tomography comprising providing a multiple-pinhole collimator and a detector having a surface for registering photons or gamma quanta which pass through the multiple-pinhole collimator, spacing an object to be imaged and the collimator a first distance which is smaller than a second distance between the multiple-pinhole collimator and the surface of the detector, imaging said object so that the photons or gamma quanta passing through the multiple-pinhole collimator form cones on the surface of the detector that always partially overlap, and moving the camera together with the collimator around the object.

7. A method as in claim 6, wherein the multiple-pinhole collimator is made from at least one metal selected from the group consisting of tungsten and iridium.

8. A method as in claim 6, wherein the multiple-pinhole collimator includes pinholes and regions formed of iridium adjacent to the pinholes.

9. A method as in claim 6, wherein the multiple-pinhole collimator includes pinholes and the pinholes open in a funnel shape from both sides into the multiple-pinhole collimator.

10. A method as in claim 6, wherein the multiple-pinhole collimator is made from at least one metal selected from the group consisting of tungsten and iridium, the multiple-pinhole collimator includes pinholes and regions formed of iridium adjacent to the pinholes, and the pinholes open in a funnel shape from both sides into the multiple-pinhole collimator.

11. A method as in claim 6 wherein the cones extend along an area on the surface of the detector and the partial overlap is up to 70% of the area of the cones extending along the surface of the detector.

12. A method as in claim 6, further including a reconstruction method to determine an object image including determining measured multiple-pinhole projections based on the distribution of radio-pharmaceuticals in the object, assuming different distributions of radio pharmaceuticals in the object, calculating multiple projections from the assumed distributions, and selecting as a result of the reconstruction the assumed distribution for which the calculated multiple-pinhole projections most accurately agrees with the measured multiple-pinhole projections obtained.

* * * * *